L. G. A. F. JAEKEL.
MOTOR SLEIGH.
APPLICATION FILED OCT. 24, 1919.

1,399,624.

Patented Dec. 6, 1921.
3 SHEETS—SHEET 1.

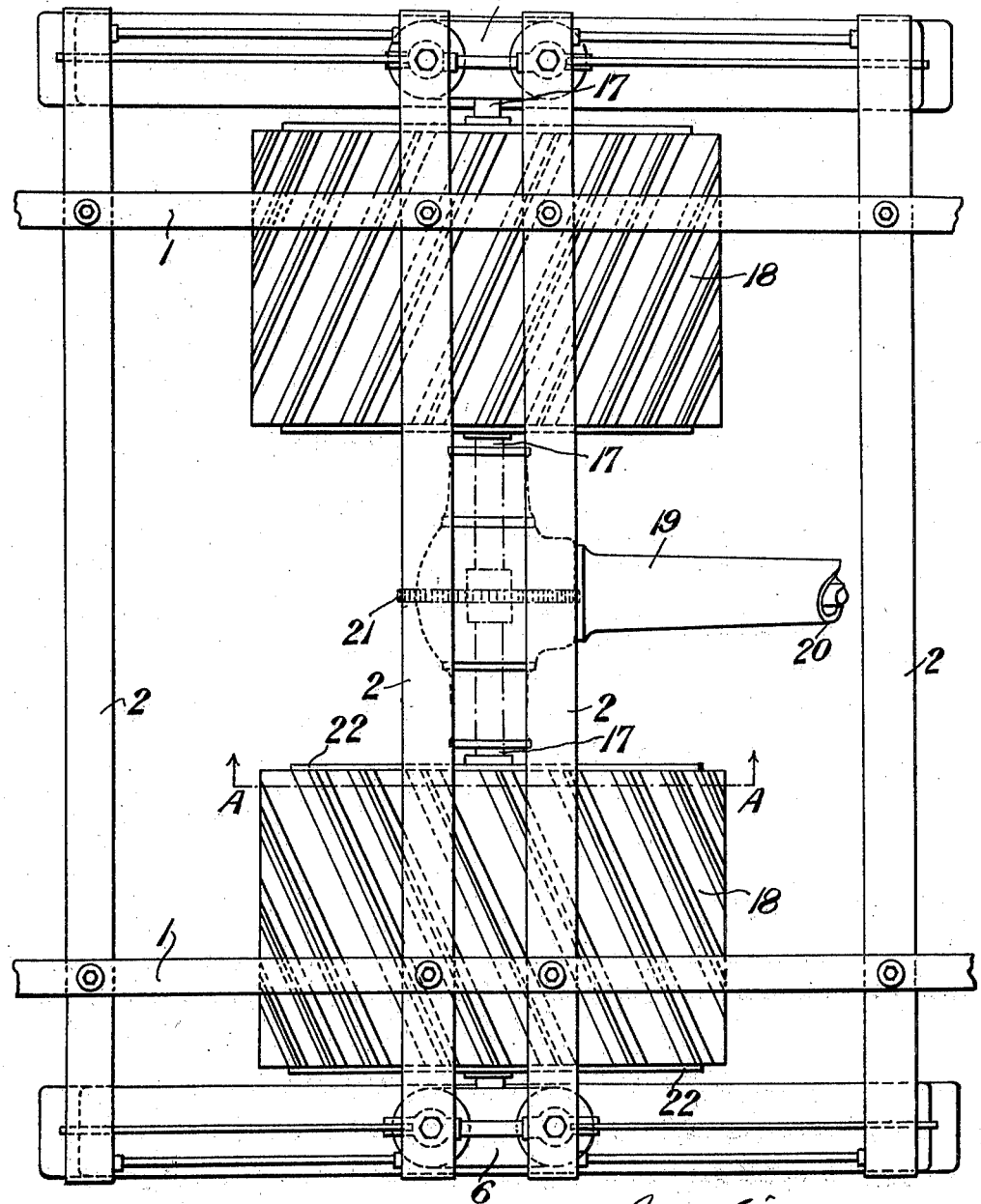

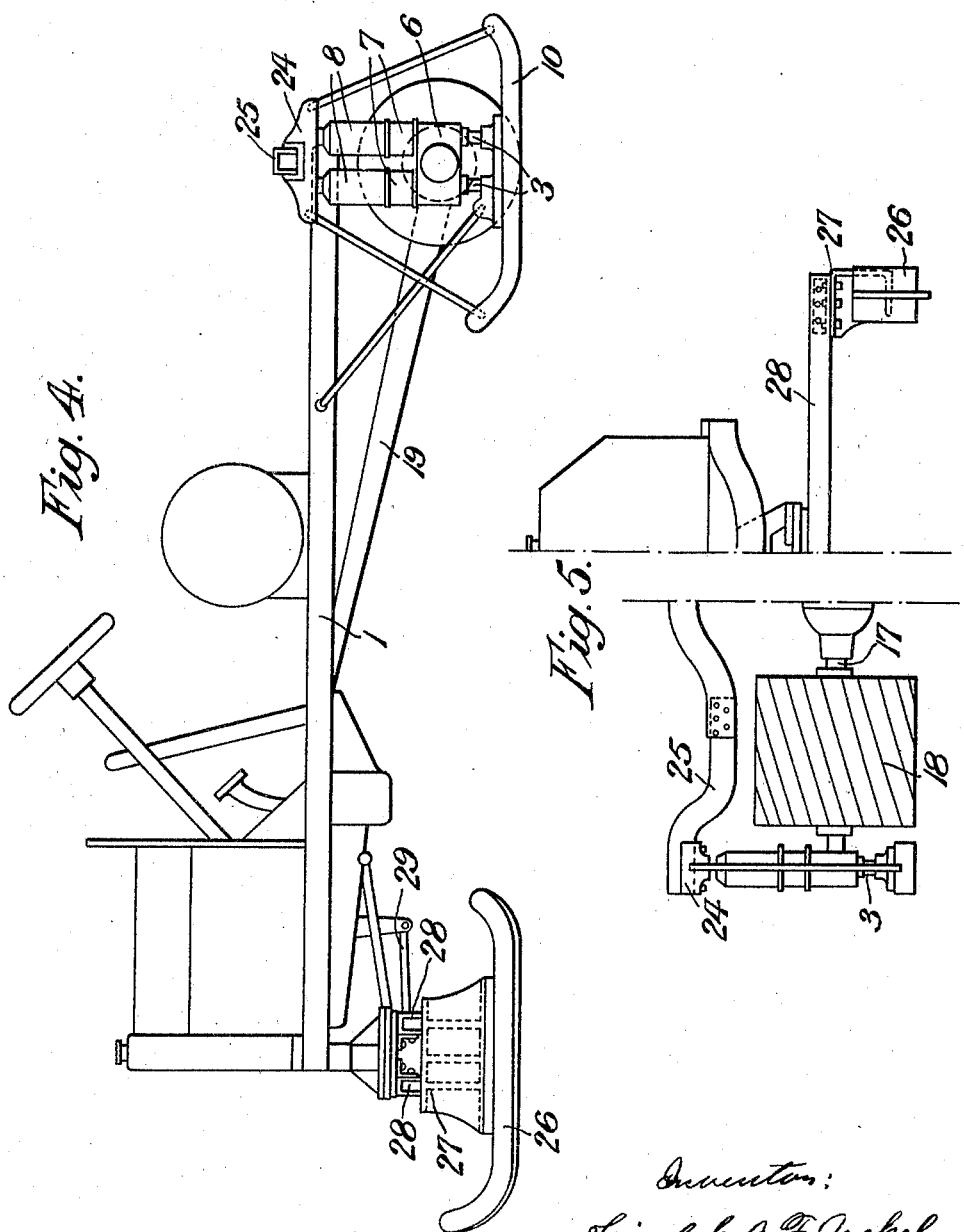

UNITED STATES PATENT OFFICE.

LIONEL GUSTAVUS ANDREW FERGUSON JAEKEL, OF LUTON, ENGLAND.

MOTOR-SLEIGH.

1,399,624. Specification of Letters Patent. Patented Dec. 6, 1921.

Application filed October 24, 1919. Serial No. 333,091.

*To all whom it may concern:*

Be it known that I, LIONEL GUSTAVUS ANDREW FERGUSON JAEKEL, citizen of Esthonia, formerly a Russian subject, residing at Hillfoot, Hart Hill, Luton, Bedfordshire, England, have invented new and useful Improvements in Motor-Sleighs, of which the following is a specification.

This invention relates to improvements in motor sleighs.

The object of this invention is to provide a motor sleigh which will be efficient whatever may be the condition of the snow. Difficulty has been experienced in designing a motor sleigh which shall be always efficient, because where snow is nearly at its melting point, it readily cakes into a hard substance, while at very low temperature the snow becomes very soft and powdery.

According to my invention the means for propelling the sleigh consists of an openwork driving drum mounted in such a manner as to be pressed on to the snow by means such, for example, as springs. When an openwork drum is employed the snow does not cake on it to any harmful extent.

A further object of my invention is to provide an arrangement enabling an automobile readily to be converted into a motor sleigh and vice versa.

Figure 1:
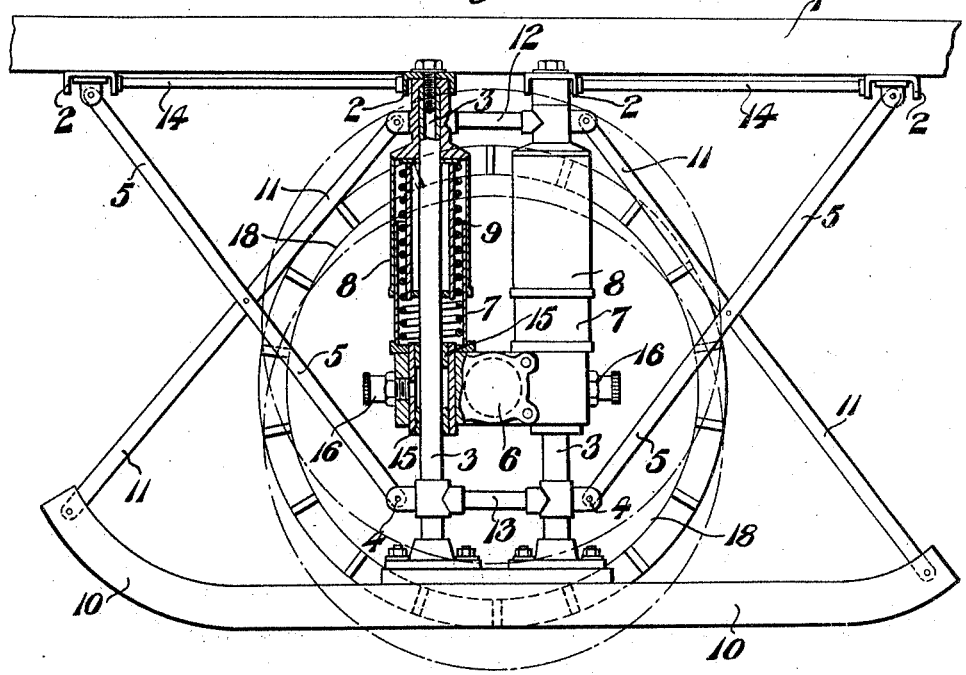
Figure 3:
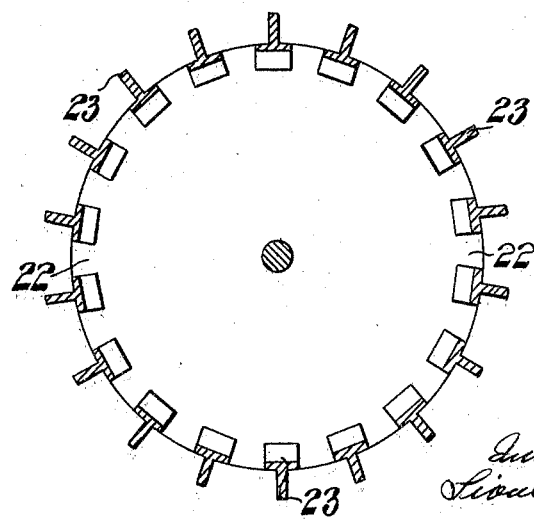

In the accompanying drawings which illustrate the invention, Figure 1 is a side elevation partly in section; Fig. 2 is a plan thereof, the construction of the driving drums being shown conventionally; Fig. 3 is a section on the line A—A, Fig. 2; Fig. 4 is a side elevation and Fig. 5 is a half rear elevation and a half front elevation, the Figs. 4 and 5 showing an automobile converted into a motor sleigh.

Referring to Figs. 1, and 2:—1, 1, are the side members of the frame. To the side members 1 are bolted four cross members 2. To the two inner cross members 2 on either side of the frame are secured rods or tubes 3, having at their lower ends a brace 4 connected by tie rods 5 to the outer cross members 2. Slidably mounted on each pair of rods 3 is a plumber block 6. Interposed between the plumber block and the upper end of the tubes 3 are spring buffers consisting of an inner cylinder 7 carried by the plumber block 6 and an outer cylinder 8, at the upper end of the rod 3. 9 are buffer springs.

To the lower end of the rods 3 are secured the rear runners 10, their ends being trussed by tie rods 11 to a brace 12 connecting the cylinder 8. The lower ends of the rods 3 are also connected together by a brace 13. 14 are compression members between the cross members 2. The plumber blocks 6 are bushed at 15 and are provided with lubricators 16. 17 is the axle rotating in the plumber blocks 6, and having mounted thereon a pair of drums 18. 19 is a torque tube and 20 a propeller shaft for driving the axle 17. In the case of a chain driven motor sleigh, a chain wheel 21 shown in dotted lines in Fig. 2 is secured to the axle 17.

Each drum 18 consists of a pair of end disks 22 having bolted thereto a plurality of T shaped members 23 arranged at an angle to the axis of the drum and a distance apart as shown in Figs. 2 and 3.

In Figs. 4 and 5 the rods 3 are carried by brackets 24 secured to a single cross member 25.

When converting an automobile into a motor sleigh the back axle and springs are removed, the cross members 2, Figs. 1 and 2, or cross member 25, Fig. 4, bolted to the side members of the automobile frame, and the torque tube 20 or chain 2 as the case may be is connected to the engine or gear box of the automobile.

The front runners 26 are mounted on brackets 27 carried by cross members 28 pivoted to the frame and connected to the steering arm 29.

In operation the driving drums 18 are pressed downwardly by the buffer springs 9. When traveling over soft snow the drums 18 may be below the level of the runners while, when traveling over hard snow or when the runners are in ruts the drums 18 may be above the level of the runners, the two extreme positions of the drums 18 being shown by the dotted circles in Fig. 1.

It is to be understood that the invention is not confined to the use of spring buffers for pressing the drums in a downward direction; any other suitable means may be employed to effect this.

What I claim is:—

In a sleigh attachment for motor vehicles, the combination of cross members adapted to be attached to a vehicle frame, pairs of vertical standards depending from said cross members, runners secured to the lower ends of said standards, truss rods connecting the lower ends of said standards with said cross members, truss rods connecting the upper ends of said standards with said runners, sliding axle boxes mounted on said standards, an axle mounted in said boxes, telescoping spring housings on said rods, springs in said housings tending to force said boxes downwardly, and an open-work driving drum mounted on said axle and so arranged as to project below said runners or be moved above said runners.

In testimony that I claim the foregoing as my invention I have signed my name this 19th day of September, 1919.

LIONEL GUSTAVUS ANDREW FERGUSON JAEKEL.